(12) United States Patent
Tomita

(10) Patent No.: US 8,384,920 B2
(45) Date of Patent: Feb. 26, 2013

(54) IMAGE PROCESSING APPARATUS AND METHOD, AND PROGRAM FOR IMPLEMENTING THE METHOD

(75) Inventor: Makoto Tomita, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1150 days.

(21) Appl. No.: 12/143,747

(22) Filed: Jun. 20, 2008

(65) Prior Publication Data

US 2008/0316545 A1 Dec. 25, 2008

(30) Foreign Application Priority Data

Jun. 25, 2007 (JP) ................................. 2007-166689

(51) Int. Cl.
*G06F 15/00* (2006.01)
*G06K 1/00* (2006.01)

(52) U.S. Cl. ........................................ 358/1.13; 358/1.9

(58) Field of Classification Search .................. None
See application file for complete search history.

(56) References Cited

U.S. PATENT DOCUMENTS

| 6,226,096 | B1 * | 5/2001 | Ouchi | 358/1.14 |
| 2005/0276519 | A1 * | 12/2005 | Kitora et al. | 382/305 |
| 2006/0010115 | A1 * | 1/2006 | Yoshida et al. | 707/3 |

FOREIGN PATENT DOCUMENTS

| JP | 5-314251 A | 11/1993 |
| JP | 11-331455 A | 11/1999 |

* cited by examiner

*Primary Examiner* — Thierry Pham

(74) *Attorney, Agent, or Firm* — Rossi, Kimms & McDowell LLP

(57) ABSTRACT

An image processing apparatus and method which are capable of reducing waiting time of an operator, and improving operation feeling and productivity. An input image is registered as usable data before completion of generation of vectorized data from the input image stored in a HDD. Even for a job in which the vectorization of the input image has not been completed, it is possible to set various processes, such as preview, change of the order of pages, and designation of editing of an image, other than printing.

9 Claims, 14 Drawing Sheets

FIG. 8

ALL DEVICES ON NETWORK

[PRINT] [EDIT] [MOVE/COPY] [DELETE] ⟳UPDATE

LAST UPDATE 2006 05/10 11:01:12          TOTAL: 34 DOCUMENTS

| SELECT | TYPE | DOCUMENT NAME | STORAGE PLACE | VECTORIZATION | SHEET SIZE | PAGE | DATE/TIME |
|--------|------|---------------|---------------|---------------|------------|------|-----------|
| ☐ | ... | 20041101143628 | COPIER A | DONE | A4 | 1 | 2004 11/01 14:37:24 |
| ☐ | ... | 20041221143228 | COPIER B | DONE | A4 | 1 | 2004 12/21 14:32:28 |
| ☐ | ... | 20050118162479 | PC | DONE | A4 | 1 | 2005 01/18 16:24:20 |
| ☐ | ... | 20050407212911 | SCANNER | PROCESSED 80% TO TAKE 00:26 | A4 | 2 | 2005 04/07 21:29:54 |
| ☐ | ... | 20050419145402 | COPIER B | PROCESSED 25% TO TAKE 03:45 | A4 | 1 | 2005 04/19 14:54:03 |
| ☐ | ... | 20050421095313 | COPIER B | TO BE PROCESSED TO TAKE 12:45 | A4 | 1 | 2005 04/21 09:53:20 |

820 — 822

IMAGE PROCESSING APPARATUS AND METHOD, AND PROGRAM FOR IMPLEMENTING THE METHOD

BACKGROUND OF THE INVENTION

1. Field of the Invention

The present invention relates to an image processing apparatus that performs processing, such as copying of images, an image processing method, and a program for causing a computer to execute the image processing method.

2. Description of the Related Art

Conventionally, in performing copying of images, image information input by an image input device is converted into data in a format not dependent on specific output device characteristics, which is then output in a manner adapted to the specific output device characteristics (see Japanese Patent Laid-Open Publication No. H05-314251). This method is intended to obtain the same copying results from a plurality of output devices different in output characteristics.

In the case of Japanese Patent Laid-Open Patent Publication H05-314251, in transmitting facsimile, a transmitting-side facsimile apparatus converts image data in a raster format (bitmap format) into vectorized data (vectorization), and then transmits the vectorized data to a receivina-side facsimile apparatus. The receiving-side facsimile apparatus generates a visible output after converting the vectorized data into image data. The vectorized data is generated by determining two-dimensional coordinates of end points of dot lines of the image data and processing them into vector coordinates. This method makes the image output quality independent on a specific output device, and hence is advantageous in that the degree of freedom of a combination of an input device and an output device is increased.

This advantageous merit is particularly marked in a function of achieving copying in a state where an input device and an output device are physically remote from each other, e.g. a function of copying by performing image inputting and image outputting by respective different devices on the network (remote copy function) disclosed in Japanese Patent Laid-Open Publication H11-331455.

However, the aforementioned image vectorization processing requires numerous computations which are relatively complicated, and takes long time before the vectorization processing is completed. This makes it impossible to start next-stage processing using the image over the long time before completion of the vectorization processing, and hence raises the following problems:

(1) Let's consider, for example, a mode of use in which data formed by vectorization of image data obtained by reading an original (raster image data, such as bitmap data) is temporarily stored, and a job (e.g. printing) of the vectorized data is instructed. In this case, the operator is required to perform a job-executing operation, e.g. a printing instruction after waiting for completion of the vectorization processing, and hence the productivity of the job is degraded.

(2) Further, the other device on the network cannot recognize the image data the vectorization of which is not completed as an object for which the job is to be performed, and hence cannot start a job operation which uses the image the vectorization of which is not completed.

SUMMARY OF THE INVENTION

The present invention provides an image processing apparatus and method which are capable of reducing waiting time of the operator, and improving operation feeling and productivity, and a program for implementing the method.

In a first aspect of the present invention, there is provided an image processing apparatus comprising an image storage unit configured to store an input image, a data conversion unit configured to convert an input image stored in the image storage unit and to generate vectorized data, a data transfer unit configured to transfer the vectorized data to a unit that processes the vectorized data, and a setting unit configured to be capable of performing setting concerning data transfer before generation of the vectorized data to be transferred by the data conversion unit is completed.

With the configuration of the image processing apparatus according to the first aspect of the present invention, it is possible to make earlier time at which an operator or the like can perform a setting process. This makes it possible to reduce waiting time of the operator, and shorten time required for completion of printing, and therefore improve operation feeling and productivity.

In a second aspect of the present invention, there is provided an image processing method comprising an image storage step of storing an input image, a data conversion step of converting an input image stored in the image storage step and generating vectorized data, a data transfer step of transferring the vectorized data to a unit that processes the vectorized data, and a setting step of performing setting concerning data transfer before generation of the vectorized data to be transferred in the data conversion step is completed.

In a third aspect of the present invention, there is provided a program for causing a computer to execute an image processing method, wherein the image processing method comprises an image storage step of storing an input image, a data conversion step of converting an input image stored in the image storage step and generating vectorized data, a data transfer step of transferring the vectorized data to a unit that processes the vectorized data, and a setting step of performing setting concerning data transfer before generation of the vectorized data to be transferred in the data conversion step is completed.

The features and advantages of the invention will become more apparent from the following detailed description taken in conjunction with the accompanying drawings.

BRIEF DESCRIPTION OF THE DRAWINGS

FIG. 8 is a view of an image as an example of display of a list of documents.

DETAILED DESCRIPTION OF THE EMBODIMENTS

The present invention will now be described in detail below with reference to the accompanying drawings showing preferred embodiment thereof.

Figure 1:
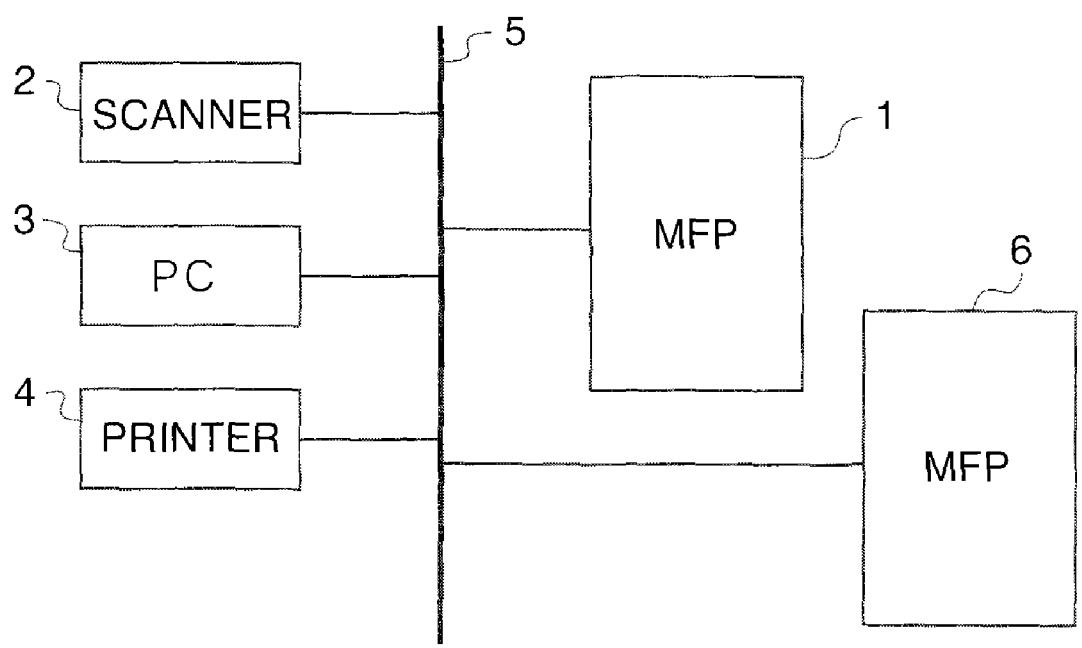
FIG. 1 is a block diagram of the whole configuration of an image processing system as an image forming apparatus according to a first embodiment of the present invention.

FIG. 1 is a block diagram of the whole configuration of an image processing system as an image forming apparatus according to a first embodiment of the present invention.

In FIG. 1, the image processing system as the present embodiment is comprised of an image input device, a data storage device, and an image output device, in its minimum form of configuration. A multifunction peripheral (MFP) 1 and a multifunction peripheral (MFP) 6 can each form the image processing system by itself.

The present embodiment is also applicable to a configuration in which the image input device, the data storage device, and the image output device are connected to each other via a LAN 5, and the devices implemented by a scanner 2, a PC 3, and a printer 4, respectively.

Figure 2:
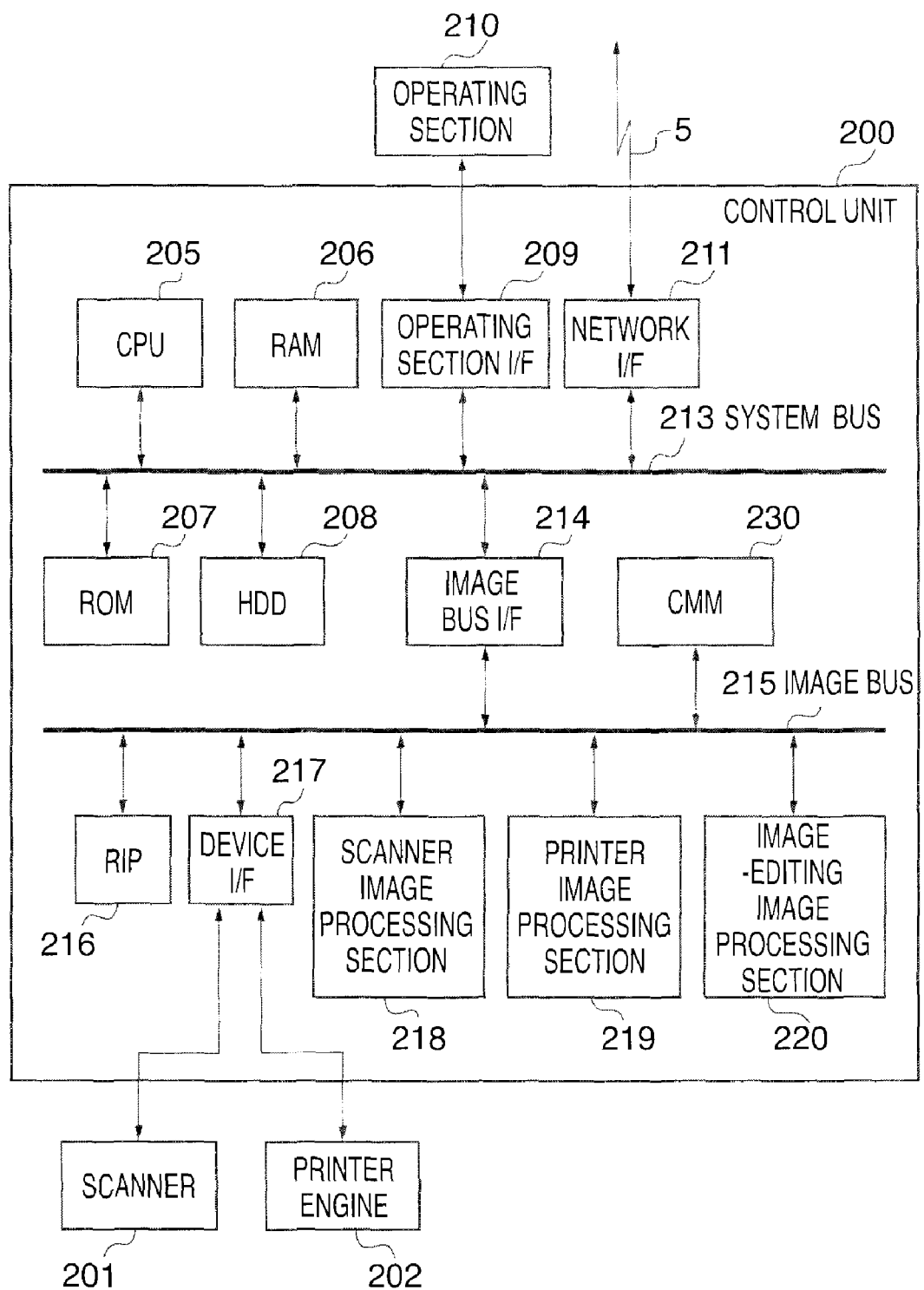
FIG. 2 is block diagram of an example of the configuration of a control unit of a multifunction peripheral (MFP).

FIG. 2 is block diagram of an example of the configuration of a control unit (controller) of each of the MFPs 1 and 6 of the image processing system according to the present embodiment.

In FIG. 2, the control unit 200 is connected to a scanner 201 as the image input device, and a printer engine 202 as the image output device, and performs control required in reading of image data and printout. Further, the control unit 200 is connected to the LAN 5, whereby it is also in charge of control for receiving and delivering image information and device information over the network.

In the control unit illustrated in FIG. 2, reference numeral 205 denotes a CPU, i.e. a central processing unit that controls the whole system. Reference numeral 206 denotes a RAM which serves as a system work memory used by the CPU 205 for operation thereof, and also serves as an image memory for temporarily storing input image data. Reference numeral 207 denotes a ROM which is a boot ROM storing a system boot program. Further, reference numeral 208 denotes a hard disk drive (HDD) that stores system software for various kinds of processes, input image data, and so forth.

Further, in FIG. 2, reference numeral 209 denotes an operating section interface that has a display screen capable of displaying image data and the like. The operating section interface 209 provides interface for an operating section 210, and outputs image data to the operating section 210. Further, the operating section interface 209 plays the role of notifying information input by an operator (i.e. the user of the present image processing system) from the operating section to the CPU 205. Reference numeral 211 denotes a network interface implemented e.g. by a LAN card which is connected to the LAN 5, for delivering and receiving information to and from external devices and apparatuses.

The control unit 200 of the image processing system as the image processing apparatus according to the present embodiment has the aforementioned devices arranged on a system bus 213.

Next, an image bus interface 214 provides interface for connecting between the system bus 213 and an image bus 215 for, high-speed transfer of image data, and serves as a bus bridge for converting data structure. The image bus 215 can be implemented e.g. by a PCI bus or IEEE1394. Connected to the image bus 215 are devices, described in detail hereinafter, including a RIP 216, a device interface 217, a scanner image processing section 218, a printer image processing section 219, an image-editing image processing section 220, and a color management module (CMM) 230.

The raster image processor (RIP) 216 converts PDL code data or vector data, referred to hereinafter, into raster (bitmap) data. The device interface 217 connects the scanner 201, the printer engine 202, etc. with the control unit 200.

Further, the scanner image processing section 218 performs various kinds of processing, such as correction, modification, and editing, on input image data. The printer image processing section 219 performs processing, such as correction and resolution conversion, on the image data for printout in a manner adapted to printer characteristics. The image-editing image processing section 220 performs various kinds of image processing, such as rotation of image data, and compression/expansion of image data. The CMM 230 is a dedicated hardware module that performs color conversion processing on image data based on a profile and calibration data.

It should be note that the scanner 2 has the same configuration as illustrated in FIG. 2, except that it is not provided with the printer engine 202 and the printer image processing section 219. Further, the printer 4 also has the same configuration as illustrated in FIG. 2, except that it is not provided with the scanner 201 and the scanner image processing section 218.

Figure 3:
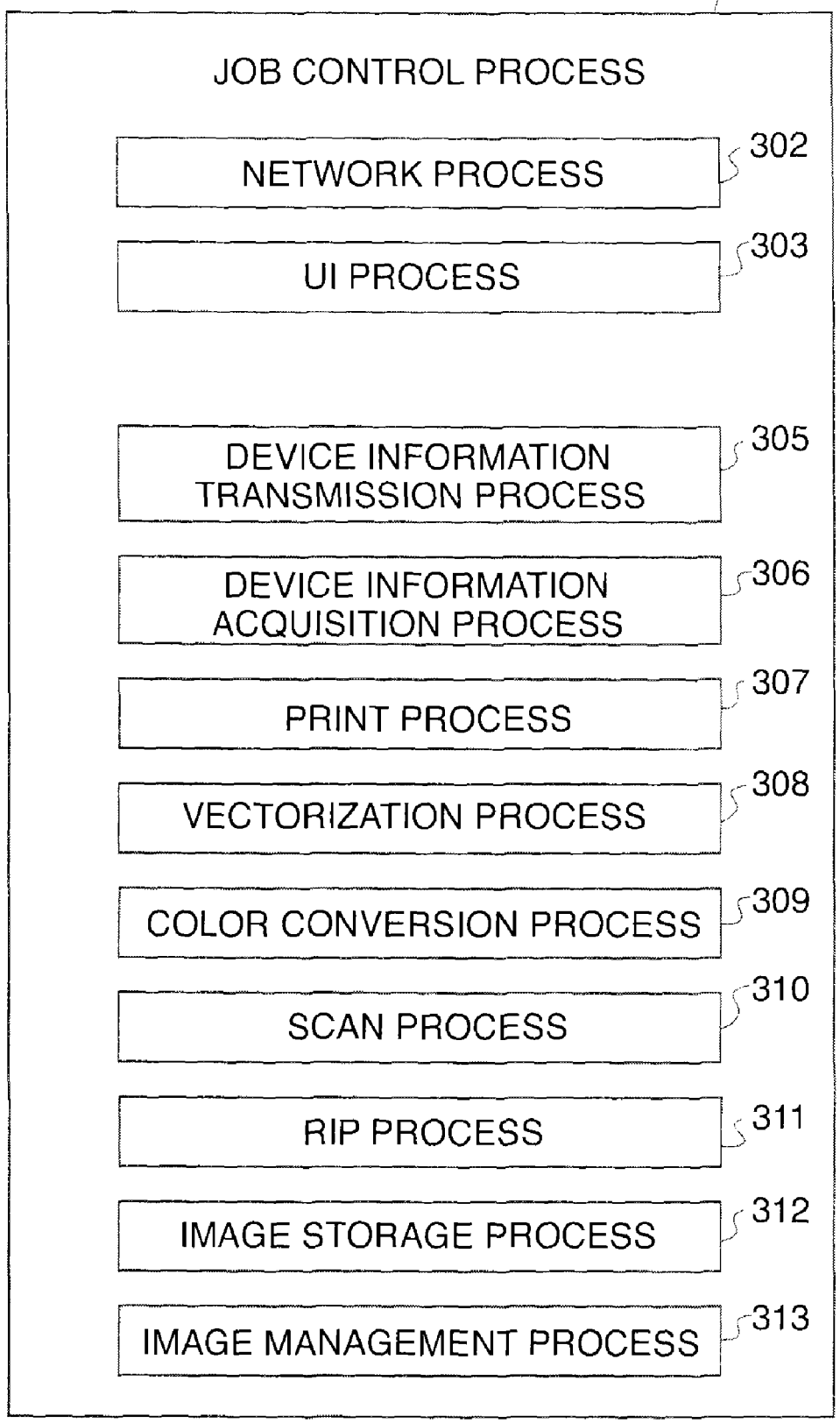
FIG. 3 is a block diagram of an example of the configuration of modules of controller software.

FIG. 3 is a block diagram of an example of the configuration of modules of controller software that operate on the control unit 200 of the MFP 1 illustrated in FIG. 1. This software mainly operates on the CPU 205.

A job control process 301 in FIG. 3 performs centralized control of software modules, shown and not shown, to thereby control all jobs occurring within the MFP 1. A network process 302 is a module for controlling communication with the outside executed mainly via the network interface 211, and controls communication with devices and apparatuses on the LAN 5. When the network process 302 receives a control command or data from a device or apparatus on the LAN 5, it notifies contents thereof to the job control process 301. Further, according to an instruction from the job control process 301, the network process 302 sends a control command and data to each of devices and apparatuses on the LAN 5.

A UI process 303 is a module for performing control mainly concerning the operating section 210. The UI process 303 notifies information on operator's operation of the operating section 210 to the job control process 301, and controls details of display of a display screen on the operating section 210 according to an instruction from the job control process 301. A print process 307 is a module for controlling the image-editing image processing section 220, the printer image processing section 219, and the printer engine 202 to thereby performing printing of a designated image according to an instruction from the job control process 301.

The print process 307 receives image data, image information (size, color mode, and resolution of image data), layout information (offset, expansion/reduction, layout), and output sheet information (size and printing direction) from the job control process 301. Then, the print process 307 controls the image processing section 220 and the printer image processing section 219 to thereby perform appropriate image processing on the image data, and controls the printer engine 202 to thereby perform printing on a designated sheet.

A scan process 310 is a module for controlling the scanner 201 and the scanner image processing section 218 according to an instruction from the job control process 301 to thereby read an original on the scanner 201. The instruction from the job control process 301 includes a color mode, and hence the scan process 310 performs processing dependent on the color mode. More specifically, if the color mode is set to a mode for color printing, the original is input as a color image, whereas if the color mode is set to a mode for monochrome printing, the original is input as a monochrome image. If the color mode is set to an "Auto" mode, after determining whether the original has a color image or a monochrome image, the original is input as an image dependent on a result of the determination.

The scan process 310 executes scanning of the original on an original platen board, not shown, of the scanner 201, to thereby input an image thereof as digital data. The color information on the input image is notified to the job control process 301. Further, the scan process 310 controls the scanner image processing section 218 to thereby performs appropriate image processing on the input image, such as compression of the image, and then notifies the input image on which the image processing has been performed to the job control process 301.

An image storage process 312 is a module responsive to notification of the input image on which the image processing has been performed from the job control process 301, for storing the input image in the HDD 208. Further, in response to notification of vectorized data from the job control process 301, the image storage process 312 stores the vectorized data in the HDD 208. Upon completion of storage of each image, the image storage process 312 notifies the registered image to the job control process 301.

An image management process 313 is a module for managing images stored in the HDD 208 by the image storage process 312, and searches for an image needed by the job control process 301 to provide the same thereto. A vectorization process 308 is a module responsive to notification of the image on which the image storage process has been completed, from the job control process 301, for reading the notified image from the HDD 208 and performing vectorization thereof. Then, the vectorization process 308 notifies the vectorized data to the job control process 301.

A color conversion process 309 is a module for performing color conversion on designated image according to an instruction from the job control process 301, and notifies the color-converted image to the job control process 301.

The job control process 301 notifies the color conversion process 309 of input color space information, output color space information, and an image to which the color conversion is to be applied. A device information transmission process 305 is a module responsive to an instruction from the job control process 301, for performing transmission of device information to the designated device via the network process 302. The device information includes a device type name, a type of printer engine, a resolution of the printer engine, an output profile and so forth. A device information acquisition process 306 performs transmission of a device information acquisition request to a designated device via the network process 302, according to the job control process 301.

A RIP process 311 is a module for interpreting PDL or vectorized data according to an instruction from the job control process 301, and controlling the RIP 216 to thereby perform rendering, for conversion of the PDL or vectorized data into a bitmap image.

It should be note that the scanner 2 has the same software configuration as illustrated in FIG. 3, except that it is not provided with the print process 307 and the RIP process 311. Further, the printer 4 also has the same software configuration as illustrated in FIG. 3, except that it is not provided with the vectorization process 308 and the scan process 310.

Figure 4:
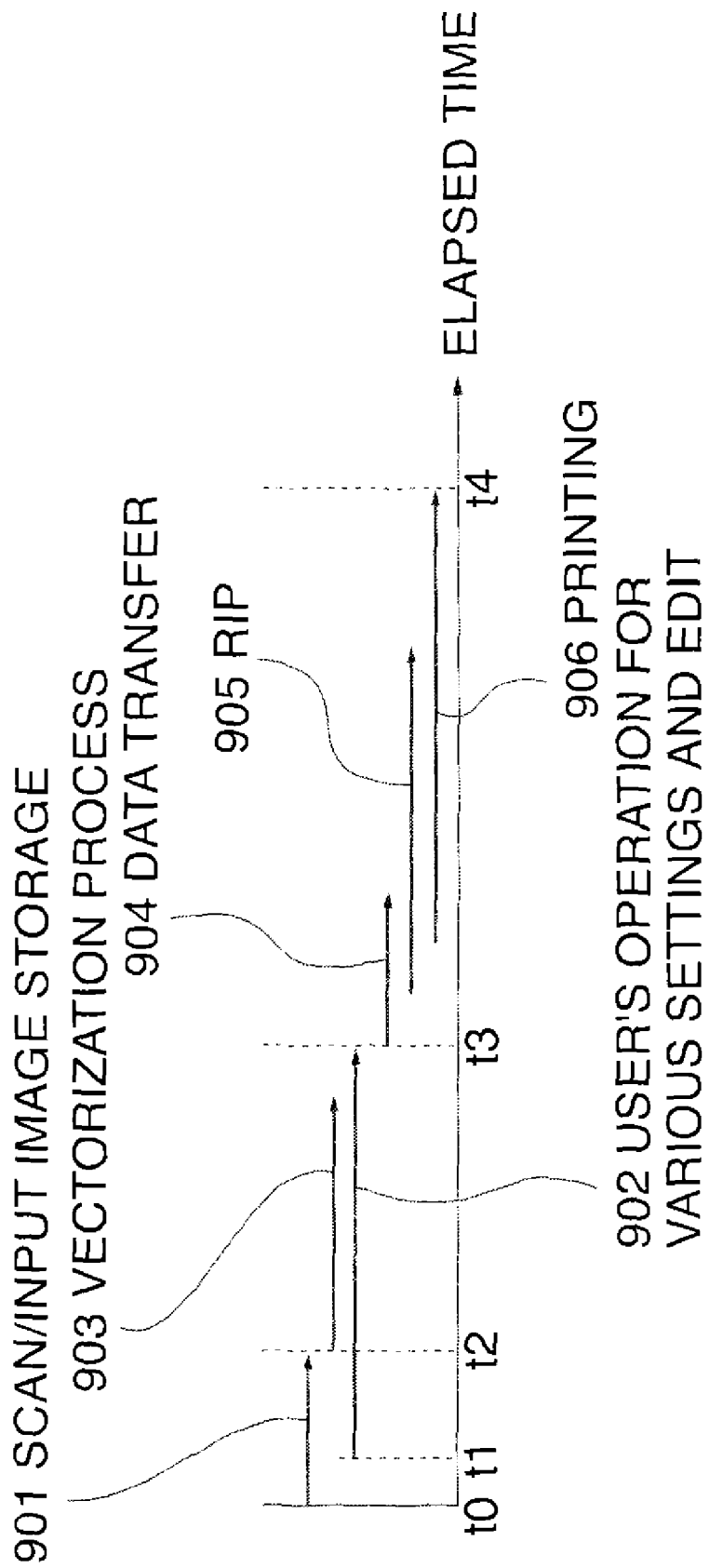
FIG. 4 is a timing diagram showing an overall flow of processing performed by the image processing system as the image processing apparatus according to the first embodiment.

Next, a description will be given of the processing order of the scan process, the vectorization process, and the remote printing process by the image processing system as the image processing apparatus according to the present embodiment with reference to a timing diagram shown in FIG. 4. FIG. 4 is a timing diagram showing an overall flow of processing performed by the image processing system as the image processing apparatus according to the first embodiment. In FIG. 4, the MFP 1 performs the scan process and the vectorization process. Then, the data vectorized by the MFP 1 is transmitted to the MFP 6, where the vectorized data is converted into RIP (Raster Image Processing) for printout.

In the MFP 1, the operator performs various settings from the operating section 210, and when storage of a scanned image is instructed (t0), the MFP 1 executes the scan process on an original as an input image and the storage process for storing a scanned image of the original (original image) into the HDD 208 (901). The scanned original image is not yet vectorized at this time point, and hence it is stored in the HDD 208 in the form of raster data (bitmap data). At the time point (t1) of completion of the scan process on a first page of the original and the storage process for storing the same into the HDD 208 (901), the operator can perform an operation for setting a job on the input image or editing the same (902), and start to set up remote printing. Then, when the scan process and storage process on all pages of the original is completed, the vectorization process (903) is started (t2).

After the operation for setting the job on the input image (902) is completed, if the user pushes a job execution start button, implemented by a hardware key or the like, not shown, at a time point t3, the MFP 1 starts execution of a remote printing process. An operation to be performed in the case of the vectorization process (903) having been not completed at this time point will be described hereinafter. The MFP 1 transfers (904) the vectorized data to the MFP 6 that performs printout. From the time point of completion of transfer of one page of data, the MFP 6 starts RIP (Raster Image Processing) (905) sequentially for each of pages in parallel with the data transfer process (904). Then, from the time point of completion of RIP of one page of data, printing (906) is performed sequentially for each of pages to be continued until the output of all pages is completed (t4).

Now, even when the vectorization process (903) is not completed, the operator can start the operation (902) on a job which is to be executed on data being vectorized, after completion of the vectorization process thereon. Therefore, the operator is not required to wait for the completion of the vectorization process (902), and it is possible to reduce time before the operator completes the operation, or the remote printing is completed.

The following gives detailed description of each of the above-mentioned processes.

Figure 5:
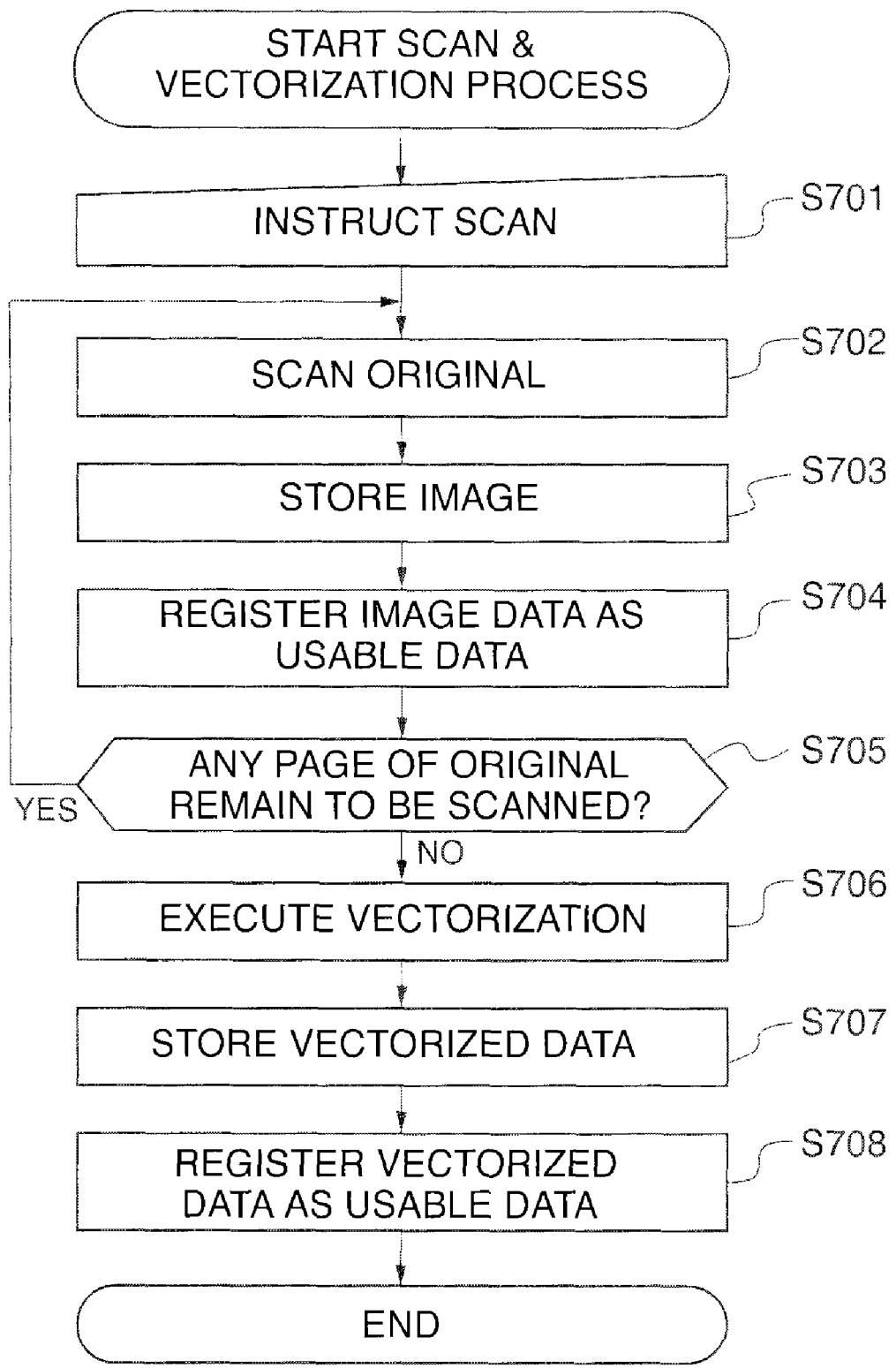
FIG. 5 is a flowchart of a scan process executed by the image processing system according to the first embodiment.

First, a description will be given of the scan process by the image processing system as the image processing apparatus according to the present embodiment with reference to FIG. 5. FIG. 5 is a flowchart of the scan process (901) and the vectorization process (903) executed by the image processing system according to the first embodiment. This processing (scan process+vectorization process) is carried out e.g. by the CPU 205 reading out and executing a program stored in the HDD 208.

The scan process is started when the operator sets an original on the scanner 201 of the MFP 1, and instructs storage of the job from the operating section 210 (step S701). The operator performs various settings from the operating section 210 and pushes a start button, not shown, whereby the UI process 303 notifies of information on the settings and an instruction of storage of the scanned image to the job control process 301. Upon being notified, the job control process 301 starts the scanned image storage process at steps S702 et seq.

In a step S702, the job control process 301 gives an instruction to the scan process 310, and thereby sequentially captures pages of the original set on the scanner 201 as input images each in raster format. The input image and color information notified from the scan process 310 are stored in a buffer of the RAM 206, and the present process proceeds to a step S703.

In the step S703, the job control process 301 instructs the image storage process 312 and thereby stores the input image and the color information in the HDD 208. After completion of the storage, the job control process 301 notifies the image management process 313 of completion of the storage of the input image, for registration thereby, and the image management process 313 registers the image as a usable image in a usable image list (step S704). From this time point, the image management process 313 handles the input image stored in the HDD 208 as usable data. At this time point (corresponding to time point t1 in FIG. 4, the operator is enabled to set a job on the input image data from the operating section 210.

In a step S705, it is determined whether all pages of the original have been processed, thereby continuing the scan operation until no unprocessed pages of the original remain.

In a step S706, the job control process 301 instructs the vectorization process 308, to thereby perform the vectorization process. The vectorization process is executed on the input image stored in raster format in the HDD 208. When the vectorization of the input image is completed, in a step S707, the job control process 301 instructs the image storage process 312 to store the vectorized data in the HDD 208. Upon completion of the storage, the job control process 301 notifies the image management process 313 of the completion of the storage, and the image management process 313 registers the vectorized data in the usable image list as a usable image in association with the input image (step S708). From this time on, the image management process 313 handles the vectorized data stored in the HDD 208 as usable data similarly to the input image.

The job information stored in the HDD 208, including the image data and vectorized data, can be used in remote printing and local printing, referred to hereinafter. The remote printing refers to an output mode in which the operator designates, from the operating section of a device or apparatus connected over the network, job information formed by scanning and stored in advance, thereby causing a device or apparatus different from one storing the information to print the information. The local printing refers to an output mode in which a device or apparatus storing job information, a device or apparatus the operating section of which is operated by the operator, and a device or apparatus that outputs the job information are the same device or apparatus.

The vectorization process can be attained by executing at least one of a plurality of processes, including an OCR process and an outlining process, referred to hereinafter. The vectorized data refers to an image defined by mathematical expressions for complementing a plurality of pixels constituting straight lines and curves obtained by at least one of the above mentioned processes. In the present embodiment, a process for obtaining code data or font data by executing a character recognition process or a mark recognition process is also referred to as the vectorization process. Further, data of a raster image in which at least part thereof is vectorized is also vectorized data. It should be note that in the present embodiment, the vectorized data is not dependent on an algorithm of the vectorization process itself, but another vectorization algorithm may be applied thereto.

In performing the aforementioned remote printing or the like, if the resolution of the scanner of the MFP 1 and that of the printer of the MFP 6 are different from each other, it is necessary to perform the resolution conversion process if the transferred image data is raster image data. In general, the resolution conversion of the raster image degrades the image quality, but the vectorized data need not be subjected to the resolution conversion in the above-mentioned case (only the conversion of coordinates expressing straight lines is required, for example), and hence is advantageous in that the vectorized data suffers from no or little degradation of image quality.

Figure 6:
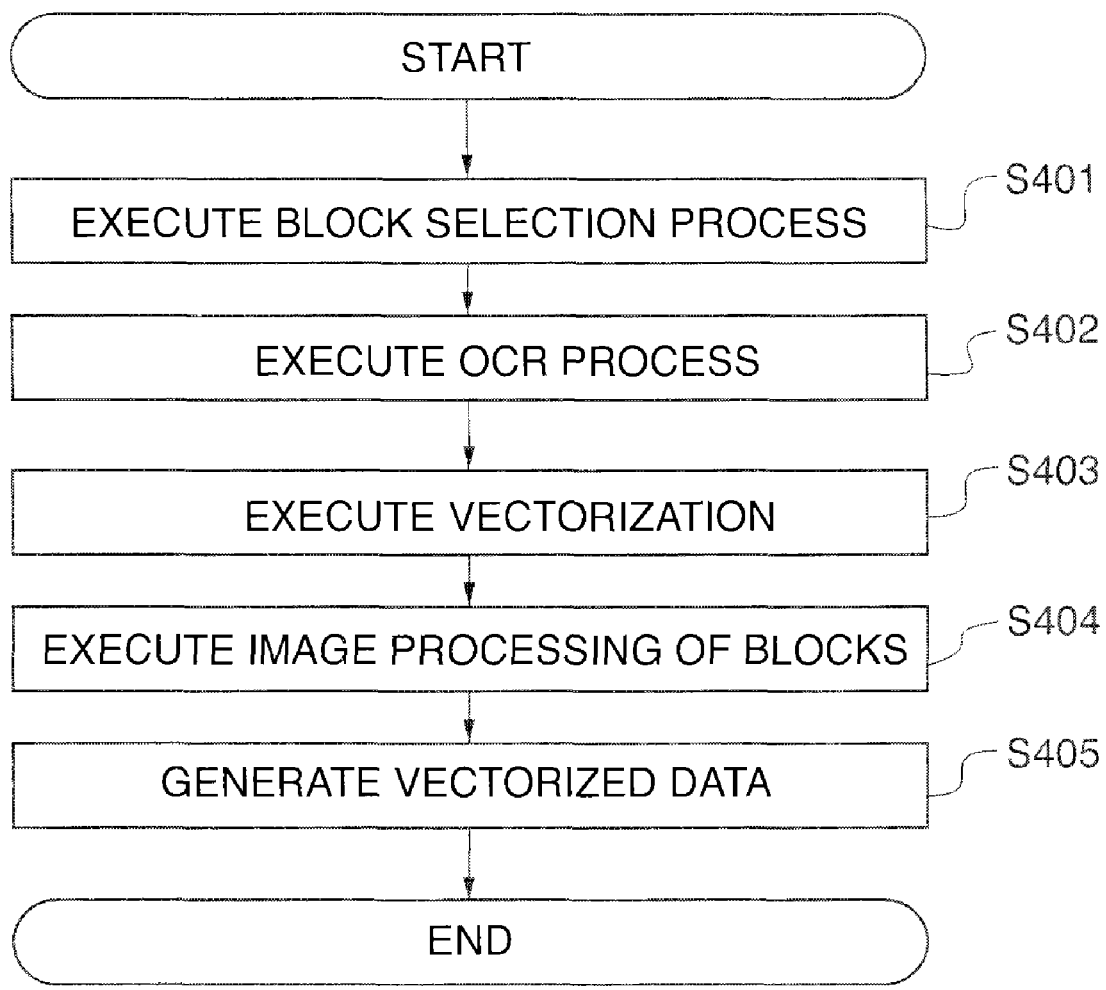
FIG. 6 is a flowchart of an example of a vectorization process.

FIG. 6 is a flowchart of an example of the vectorization process (903 in FIG. 4 and S706 in FIG. 5). This process is carried out e.g. by the CPU 205 reading out and executing a program stored in the HDD 208.

First, in a step S401, a block selection process is executed on an image as an object to be processed. The block selection process divides the image into blocks of objects contained in the image, and determines an attribute of each block, i.e. whether it is of characters (TEXT), of an image (PHOTO), of lines (LINE), of graphics (PICTURE), of a table (TABLE), etc.

In steps S402 to S405, the blocks obtained in the step S401 are subjected to processes required in vectorization. For each block determined to be of characters, an OCR (character recognition) process is carried out (step S402). For the text bock subjected to the OCR process, vectorization is further performed on each character in the input image by recognizing the size, style, typeface, etc. thereof and converting the same into font data visually faithful thereto (step S403). Further, line blocks, graphics blocks, and table blocks are also vectorized by outlining. On the other hand, image (PHOTO) blocks are separately subjected to image processing into JPEG files (step S404).

In a step S405, information on the attribute and position of each block obtained in the step S401 and OCR information, font information, vector information, and image information extracted in the steps S402 to S404 are integrated into vectorized data.

Figure 7:
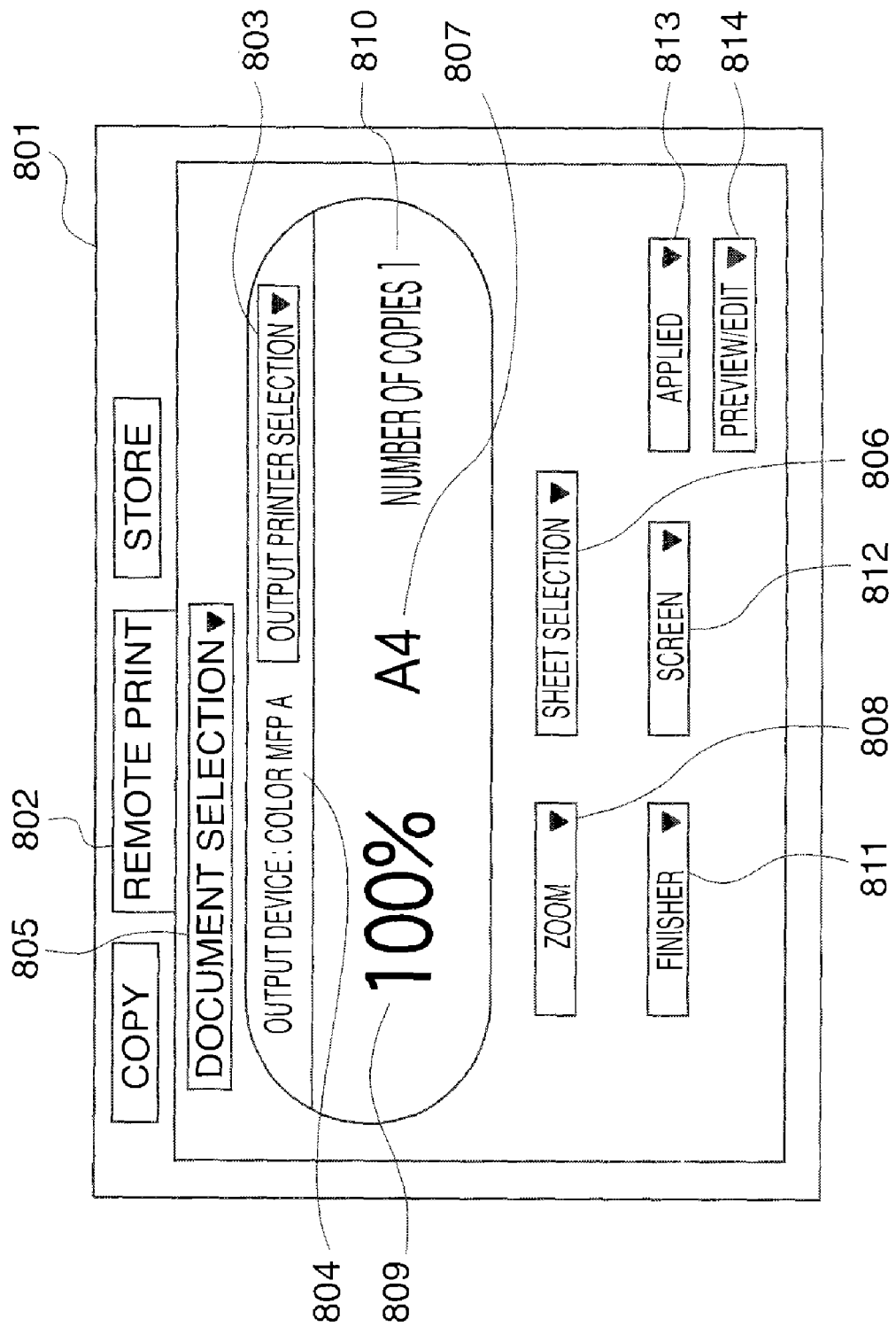
FIG. 7 is a view of an image of an example of a screen displayed on an operating section when remote printing is instructed.
Figure 9:
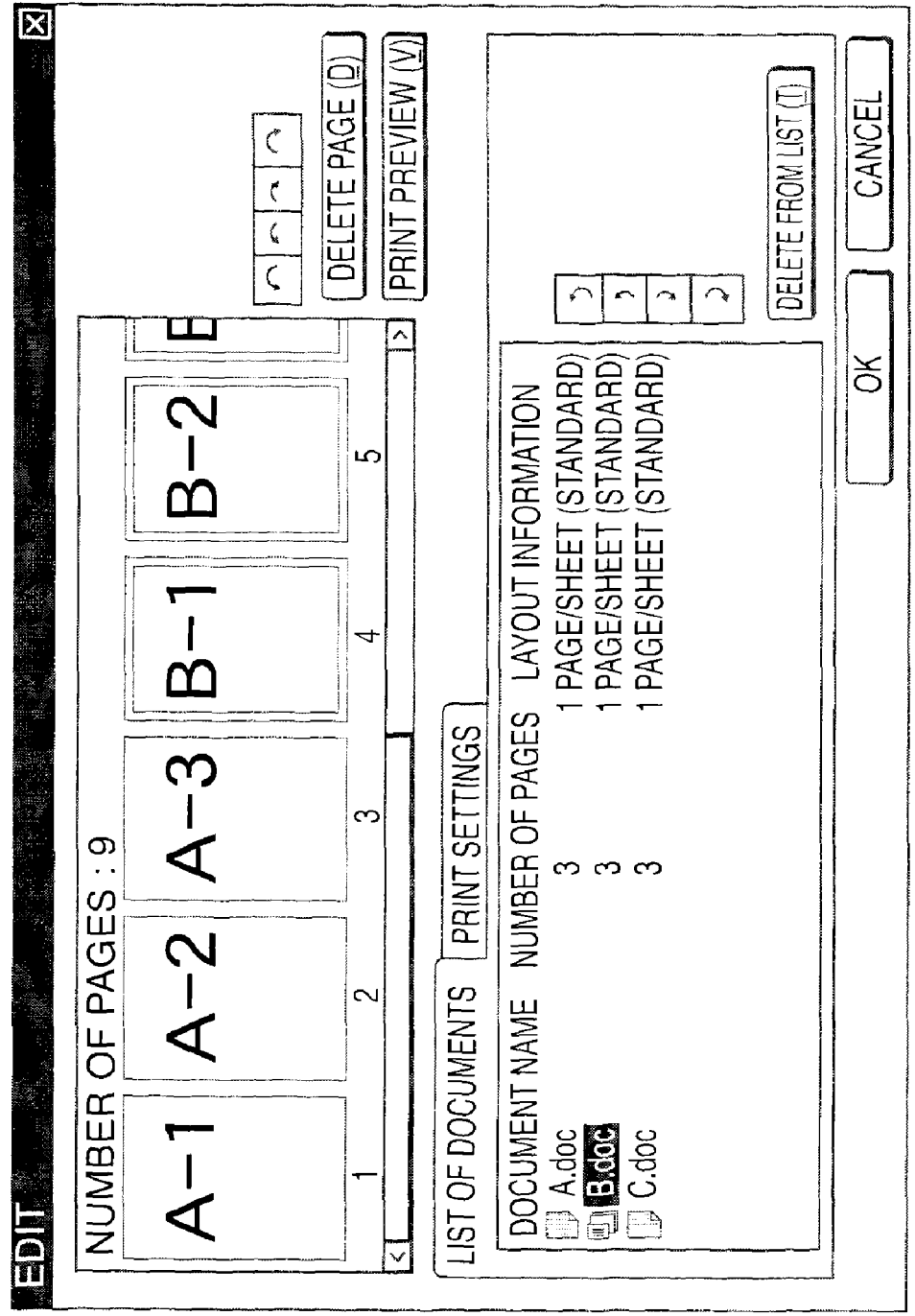
FIG. 9 is a view of an image as an example of display of a job edit operation screen.

Next, a method of setting up remote printing by the image processing system as the image processing apparatus according to the present embodiment will be described with reference to FIGS. 7, 8, and 9. FIG. 7 is a view of an image as an example of a screen displayed on the operating section when remote printing is instructed. FIG. 8 is a view of an image as an example of display of a list of selectable documents. FIG. 9 is a view of an image as an example of display of a job edit operation screen.

Here, for clarity of explanation, a device which stores image data and with which the operator performs an operation for instructing remote printing is referred to as the local device, and a device that performs printout is referred to as the remote device. Further, for convenience of explanation, a description will be given of operations in the case where a device holding the image data and a device with which the operator performs an instructing operation are the same device. In the case described with reference to FIG. 4, the MFP 1 as the local device holds image data, and the operator performs a printing instruction from the operating section of the MFP 1, while the MFP 6 gives a printout.

Actually, a place where the image data is stored and a device with which an instructing operation is performed may be respective different devices. In such a case, the MFP 6 holds image data, and the operator performs a print instructing operation from the operating section of the MFP 1, whereby the printer 4 gives a printout, for example. Further, instead of performing remote printing, the same device may perform all the operations of the above-mentioned devices including the output device, that is, local printing may be performed.

The set-up of remote printing is executed by the operator who operates the operating section 210 of the MFP 1. The screen illustrated in FIG. 7 shows an example of a screen displayed on the display of the operating section 210 when the operator instructs remote printing.

Reference numeral 801 in FIG. 7 denotes a screen for performing set-up of remote printing and starting the same, which is displayed when the operator pushes a remote print mode button 802. When the operator pushes a button 803, there is displayed a list, not shown, of remote devices each of which can be designated as a device for giving an output of remote printing, and the operator can select a remote device from the list. A remote device selected by the operator is displayed on the display area 804. The list of remote devices which can be designated as a device for giving an output of remote printing are dynamically acquired by querying a configuration managing serve, not shown. Alternatively, the list of remote devices for designation may be obtained by broadcasting into the network a packet searching for an output device capable of accepting a remote printing instruction, and listing output devices each returning a response to the packet.

Reference numeral 805 designates a button for selecting a document for printout. When the operator pushes the button, a list (shown in FIG. 8) of documents which can be selected for printout is displayed, and from the list, one or a plurality of them can be selected. At this time, the documents that can be selected are the input images and vectorized data stored in the HDD 208 of the device, and the input images and vectorized data stored in the other devices each of which is connected over the network and is capable of accepting a remote printing instruction.

The input images and vectorized data stored in the other devices may be dynamically obtained by querying a document managing server, not shown, over the network. Alternatively, they may be obtained by broadcasting into the network a packet searching for an output device capable of accepting a remote printing instruction, and dynamically listing information on vectorized data in the output devices each returning a response to the packet.

FIG. 8 is a view of an example of a list of documents displayed on the operating section 210. The list shown in FIG. 8 shows not only job information, such as document names and numbers of pages, but also device names of devices storing the data, and a state of progress of the vectorization process. The documents are displayed in the list at the time point of completion of registering usable image data in the scan process (step S704 in FIG. 5), and documents on which the vectorization process has not been completed can also be selected, edited, and given a printing instruction. For example, in the list, reference numeral 820 denotes a document which has been completely vectorized. That is, the document is vectorized data which is obtained by completion of the vectorization process 903 in FIG. 4 or completion of the process in the step S708 in FIG. 8. On the other hand, reference numeral 822 denotes a document which has been stored as raster data obtained by the scanner, but has not been completely vectorized yet. This state of the document corresponds to a state between the time point t1 to the time point t3 in FIG. 4, or a state in FIG. 5 after completion of the step S704 and before completion of the step S708. In the present embodiment, image data on which the vectorization process has not been completed are also displayed on the document list, thereby making it possible to accept execution of a job.

Referring again to FIG. 7, reference numeral 806 denote a button for selecting sheets for printout, and when the operator pushes the button, a list of sheet sizes which can be selected for use in printout is displayed, enabling selection by the user. A sheet size selected as one for printout is displayed on a display area 807. In the illustrated example in FIG. 7, "A4 size" is selected.

Reference numeral 808 denotes a "Zoom" button for designating a ratio of magnification/reduction applied to an original image during remote printing. By pushing the "Zoom" button 808, a magnification ratio-designating screen, not shown, is displayed for enabling the operator to designate a ratio of magnification/reduction on this screen. Further, the ratio of magnification/reduction designated by the operator is displayed on a display area 809. In a display area 810, the number of copies to be printed by remote printing is displayed. The number of copies can be set by the operator operating hardware keys, not shown.

Reference numeral 811 denotes a button for designating a finisher. By pushing this button 811, a finisher-setting screen, not shown, is displayed, for enabling setting sorting, stapling, punching, and so forth. Reference numeral 812 denotes a button for designating double-sided printing. By pushing this button, a double-sided printing-setting screen, not shown, is displayed for setting double-sided printing or single-sided printing, setting of a binding direction when setting double-sided printing, etc. Reference numeral 813 denote a button for setting applied functions. By pushing this button 813, it is possible to set more sophisticated applied function, such as "duplex/duplex copy", "bookbinding", and "reduction layout".

Reference numeral 814 denotes a button for preview of an output result and editing the output result. By pushing this button 814, a job editing screen, an example of which is shown in FIG. 9, is displayed, enabling the operator to designate an instruction for editing, such as changing an order of pages for printout, deletion, and insertion of a blank sheet, on a page-by-page basis. Further, it is also possible to configure the screen, such that it enables the operator to designate an instruction for image processing, such as setting of brightness or sharpness, on a page-by-page basis. In the screen shown in FIG. 9, a preview of output results is displayed using vectorized data, or input images for pages which have not been vectorized, whereby it is possible to perform setting and editing operations other than printing.

After performing various settings on the screen shown in FIG. 7, when the operator pushes a start button implemented by a hardware key, not shown, the UI process 303 notifies information on the various settings and instruction of remote printing to the job control process 301, whereby processing of remote printing is started.

Figure 10:
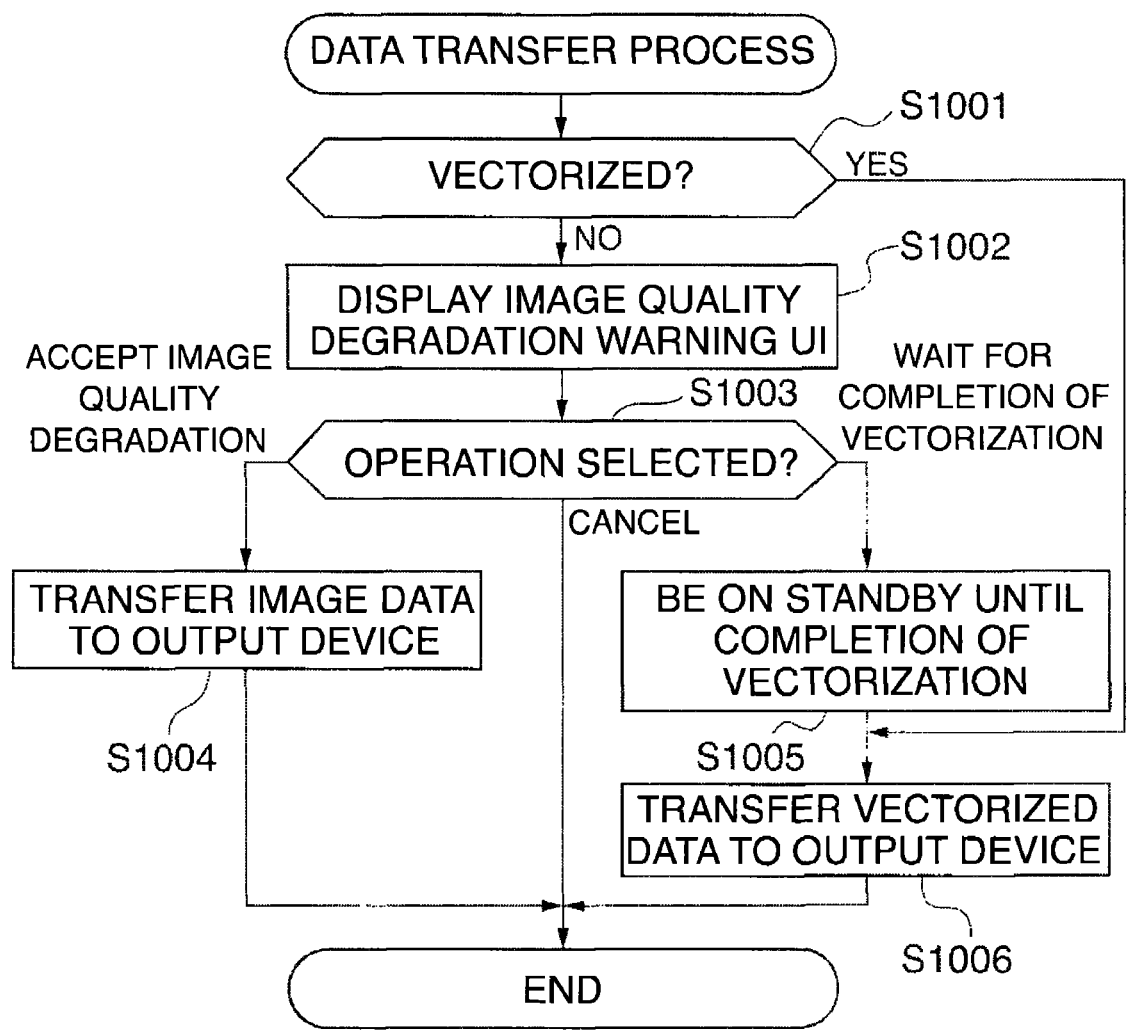
FIG. 10 is a flowchart of a data transfer process.

Next, the data transfer process (904) by the image processing system as the image processing apparatus according to the present embodiment will be described with reference to FIGS. 10 and 11. FIG. 10 is a flowchart of details of the data transfer process (904). This process is carried out e.g. by the CPU 205 of an MFP, which corresponds to the local device, reading out and executing a program stored in the HDD 208. Further, FIG. 11 is a view of a screen as an example of display of a warning message in selecting an operation.

When the data transfer process (904) is started, it is checked whether or not the vectorization process has been completed on data of all pages to be output to the remote device (step S1001). If the vectorization process has been completed, the vectorized data is transferred to the output device (step S1006), followed by terminating the present process.

Figure 11:
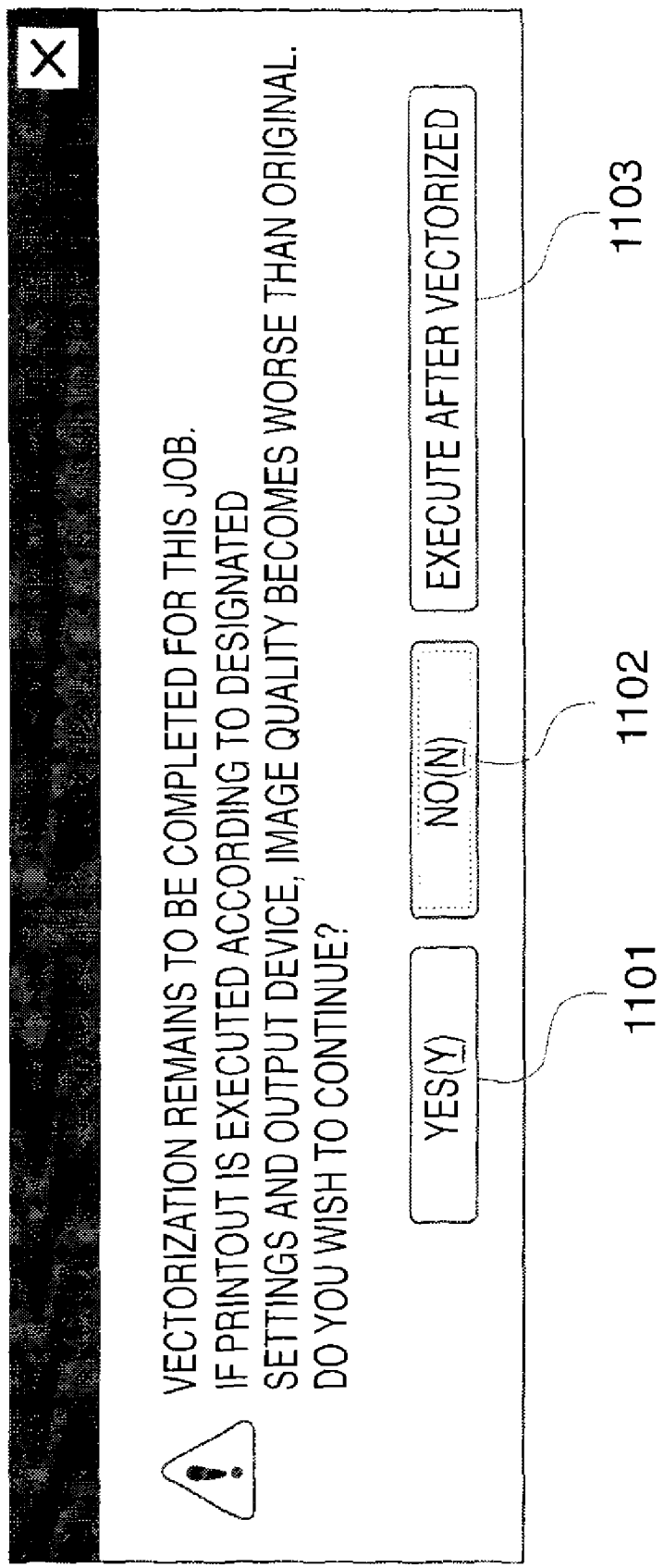
FIG. 11 is a view of a screen as an example of display of a warning message in selecting an operation.

In the case where the vectorization process has not be completed, a warning UI (warning information) of image quality degradation shown in FIG. 11 is displayed on the operating section 210 (step S1002). If the operator selects the button 1101, data is transferred to the output device without converting the format of the input image data (step S1004), followed by terminating the present process.

If the operator selects the button 1102, the data transfer process and printing process are stopped, followed by terminating the process. If the operator selects the button 1103, after waiting for completion of the vectorization process (step S1005), the vectorized data is transferred to the output device (step S1006), followed by terminating the present process.

It should be noted that whether to transfer data which has been vectorized or input image data before being vectorized may be automatically determined according to the output device. For example, in the case when local printing is to be carried out or in the case where the data transfer destination is the same type of device as that which performed the scan process, input image data before vectorization may be transferred, and otherwise, vectorized data may be transferred. When this configuration is employed, the output device to which the input image data is transferred can perform printout without image quality degradation even if the vectorization process is not completed, and hence it is not necessary to display the warning UI of image quality degradation on the operation section 210 (step S1002).

Figure 12:
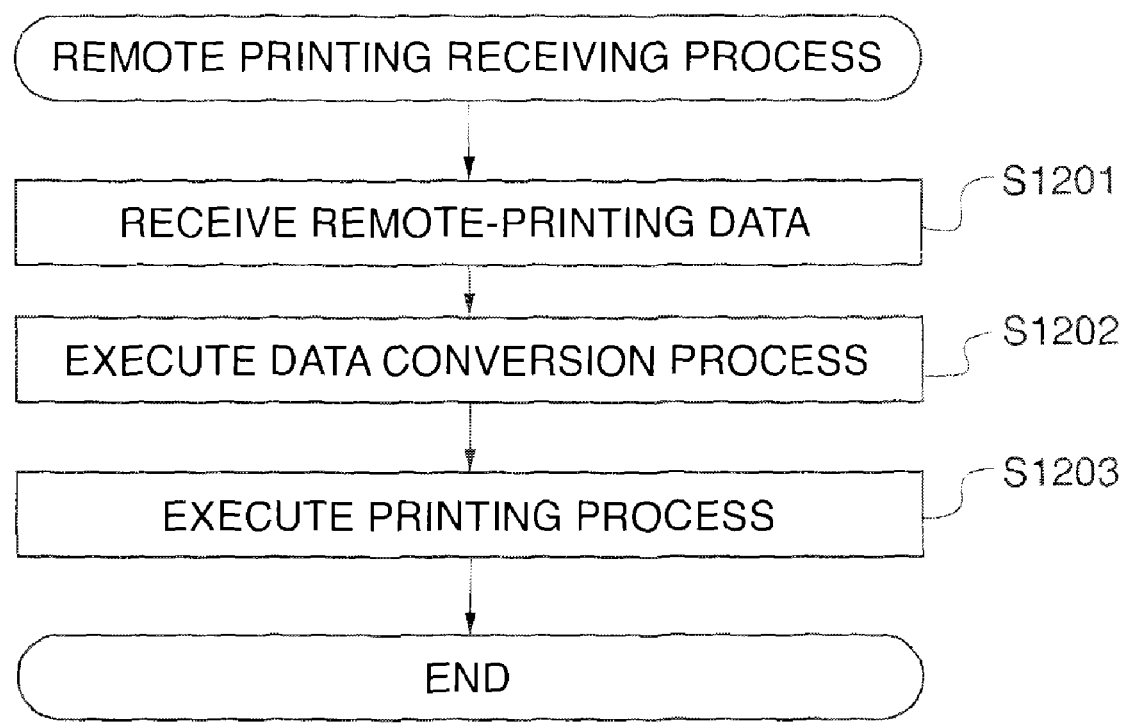
FIG. 12 is a flowchart of a remote-printing receiving process.

Next, a remote-printing receiving process by the image processing system as the image processing apparatus according to the present embodiment will be described with reference to FIG. 12. FIG. 12 is a flowchart of the remote-printing receiving process executed in the present embodiment. This process is carried out e.g. by the CPU 205 of an MFP or a printer, which corresponds to the remote device, reading out and executing a program stored in the HDD 208.

The remote-printing receiving process can be executed by all the MFPs and printers as the image processing apparatus according to the present embodiment. When the job control process 301 of each device receives data and remote printing information from a device executing the remote printing process via the network process 302, it starts the remote-printing receiving process. Here, similarly to the case of the remote printing process, the device executing the remote printing process (i.e. the device sending the data) is referred to as the local device, and the device executing the remote-printing receiving process is referred to as the remote device.

When the job control process 301 of the remote device receives one page of data and remote printing information from the device executing the remote printing in a step S1201, the present process proceeds to a step S1002.

In the step S1202, based on the remote printing information received in the step S1201, the data conversion process is performed on the received data. In the data conversion process, the format of the received data contained in the remote printing information is confirmed, and if the received data has a format of an input image, it is loaded, while if it is vectorized data, it is subjected to the RIP process by the RIP process 311. Then, according to information on the color conversion process contained in the remote printing information, the color conversion process 309 performs the color conversion of the received data into a color space dependent on the remote device, whereby the data conversion process is completed.

When the operator instructs remote printing, if the image processing has been instructed on the job editing screen on the operating section 210, the instruction is contained in the remote printing information, and the image processing is executed according to the instruction during the data conversion process.

When the data conversion process is completed, the printing process is executed (S1203). According to the data subjected to the data conversion by the data conversion process, and output sheet information and layout information set by the local device and contained in the remote printing information, the print process 307 performs printing using the printer engine 202 of the remote device, followed by terminating the printing process.

According to the present embodiment, in executing remote printing or local printing, for example, time for starting an operation by the operator can be advanced to a time point at which an input image is stored. This makes it possible to reduce waiting time of the operator, and at the same time reduce time before completion of the printing, which improves printing productivity. Further, the necessity of determining details of printing operations in advance is reduced, which improves operability for the operator. Further, even before stored image data has been completely vectorized, the data can be recognized from other devices on the network as data which can be copied, in setting a job. Therefore, it is possible to start the next-stage processing using the image earlier than the prior art, which improves the printing productivity of the whole system.

In the first embodiment, the process does not proceed to the vectorization process (step S706) until the all pages of an original are scanned and the scanned image data is registered as usable image data. However, it is also possible to perform scanning of an original in parallel with the vectorization process, and this configuration will be described hereinafter as a second embodiment of the present invention.

An image processing system as an image processing apparatus according to the second embodiment is comprised of MFPs (1, 6), a scanner 2, a PC 3, and a printer 4, similarly to the first embodiment. The present embodiment is distinguished from the first embodiment in that the timing diagram in FIG. 4 is replaced by a timing diagram in FIG. 13, and the process illustrated by the flowchart shown in FIG. 5 is replaced by a process illustrated by a flowchart shown in FIG. 14.

Figure 13:
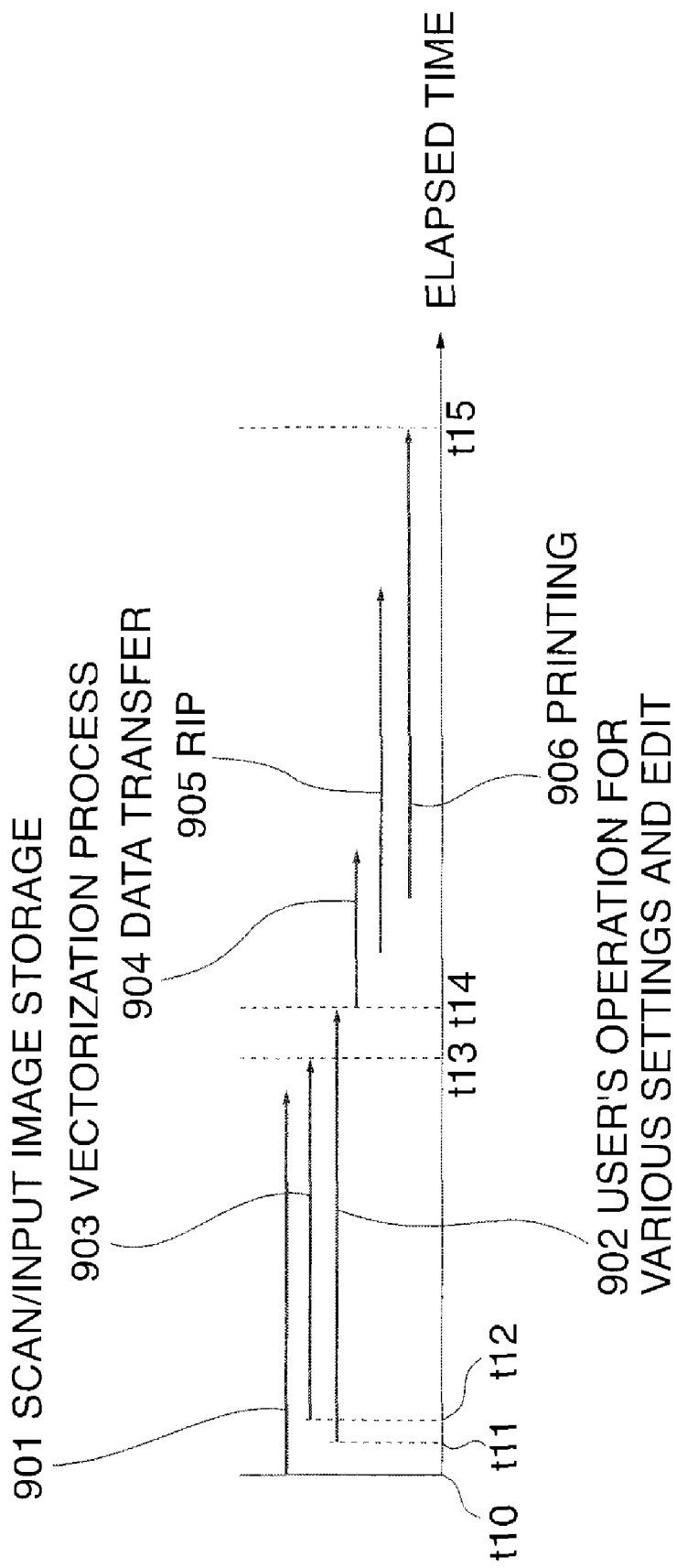
FIG. 13 is a timing diagram showing an overall flow of processing performed by an image processing system as an image processing apparatus according to a second embodiment of the present invention.

FIG. 13 is a timing diagram showing an overall flow of processing performed by the image processing system as the image processing apparatus according to the second embodiment of the present invention.

In the MFP 1, the operator performs various settings from the operating section 210, and when storage of a scanned image is instructed (t10), the MFP 1 starts execution of the scan process on an original as an input image and the storage process for storing a scanned image into the HDD 208 (901). From the time point (t12) of completion of the scan process on a first page, the vectorization process (903) is started, and is executed sequentially for each of the pages, in parallel with the scan process.

At the time point (t11) of completion of the scan process of one page and the process for storing the scanned image into the HDD 208, the operator can perform an operation for various settings or editing (902), and start to set up remote printing. It should be noted in FIG. 13, time points t11 and t12 are shown as different in timing, but they may be identical in timing. If the user pushes a job execution start button, implemented by a hardware key or the like, not shown, the printing process is started.

After the printing process is started (t14), the data transfer (904) of vectorized data to the remote device that performs printout is performed, and after a time point of completion of transfer of one page of data, the RIP process (905) is started, and executed sequentially for all pages in parallel with the data transfer process (904). Then, from a time point of completion of the RIP process of one page of data, the printing process (906) starts to be sequentially performed for all pages, and is continued up to a time point (t15) at which the printout of all the pages is completed.

In the present embodiment as well, similarly to the first embodiment, even before the vectorization process (903) is completed, the operator can start a setting operation (902), which makes it possible to shorten a time period required for completion of discharge of printed sheets.

Figure 14:
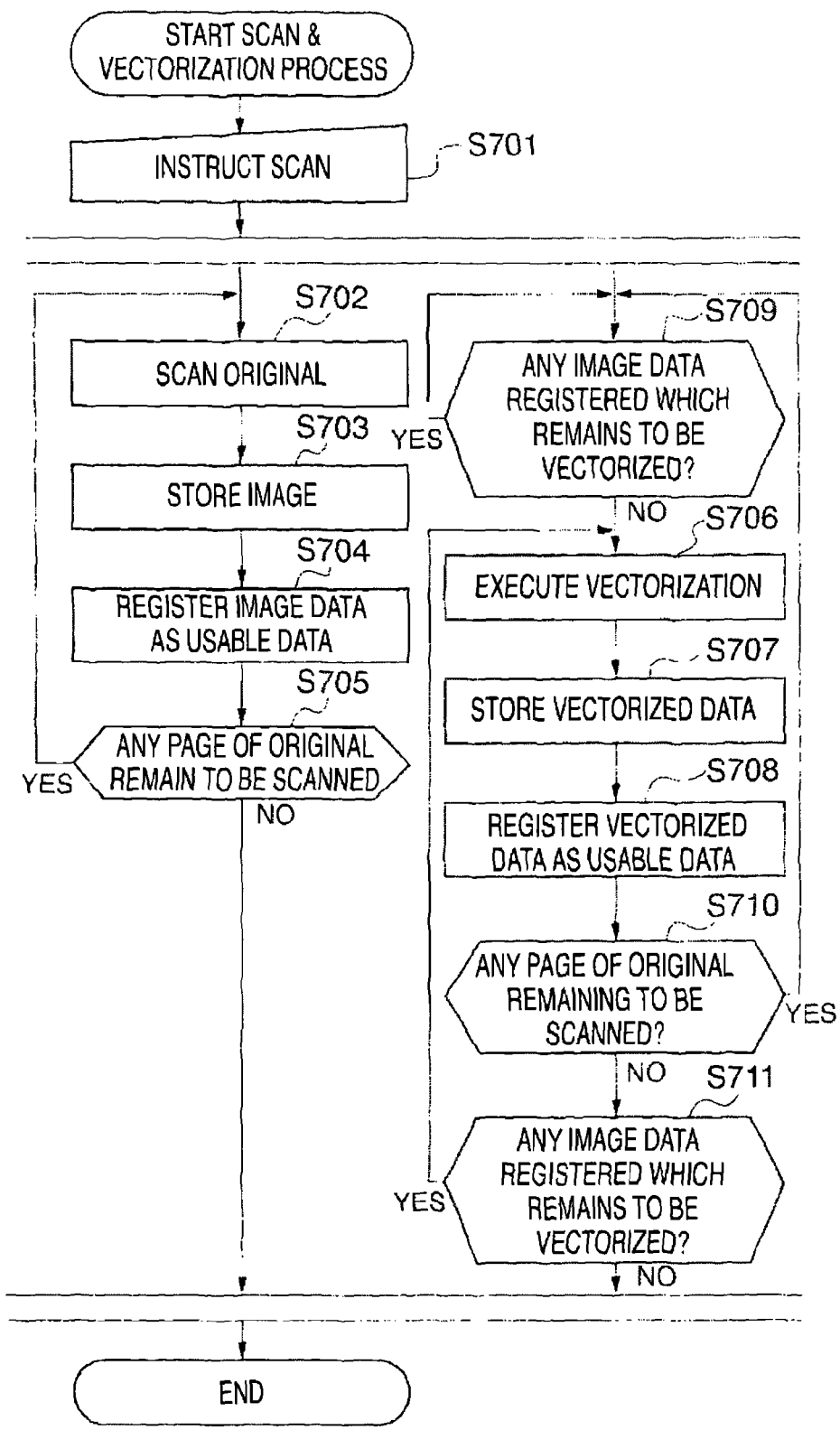
FIG. 14 is a flowchart of a scan process executed by the image processing system as the image processing apparatus according to the second embodiment.

FIG. 14 is a flowchart of a scan process executed by the image processing system as then image processing apparatus according to the second embodiment. The steps as those in FIG. 5 are denoted by the same step numbers, and description thereof is omitted. This process is carried out e.g. by the CPU 205 reading out and executing a program stored in the HDD 208.

In the present embodiment, steps S702, S703, S704, and S705, and steps S706, S707, and S708 are executed in parallel with each other. More specifically, the steps S702, S703, S704, and S705 forming a sequence of the vectorization process are executed independently of and in parallel with the steps S706, S707, and S708 forming a sequence of scan process on an original. Until the scanning of all pages of the original is completed (S710), and at the same time, the vectorization process is completely performed for all the pages of the original (S711), the steps S706, S707, and S708 are repeatedly carried out.

According to the second embodiment, in addition to the configuration of the second embodiment, the scan process and the vectorization process are executed in parallel with each other, whereby it is possible to improve job productivity.

It is to be understood that the present invention may also be accomplished by supplying a system or an apparatus with a storage medium in which a program code of software, which realizes the functions of either of the above-described embodiments, is stored, and causing a computer (or CPU or MPU) of the system or apparatus to read out and execute the program code stored in the storage medium.

In this case, the program code itself read from the storage medium realizes the functions of either of the above-described embodiments, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of either of the above-described embodiments may be accomplished not only by executing the program code read out by a computer, but also by causing an OS (operating system) or the like which operates on the computer to perform a part or all of the actual operations based on instructions of the program code.

Further, it is to be understood that the functions of either of the above-described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2007-166689 filed Jun. 25, 2007, which is hereby incorporated by reference herein in its entirety.

What is claimed is:

1. An image processing apparatus comprising:
    an image scanning and vectorization unit configured to scan and vectorize a first document; and
    a job setting unit configured, while the image scanning and vectorization unit is scanning the first document and before the image scanning and vectorization unit has completed vectorizing the first document, to (a) make available a user-interface configured to identify a plurality of documents and allow a user to select a document out of the plurality of documents, the plurality of documents including documents for which vectorization has been completed and documents for which vectorization is in process but not yet completed, the documents for which vectorization is in process but not yet completed including the first document, and (b), after a user selects, via the user-interface, the first document out of the plurality of documents identified by the user-interface, allow a user to input settings for a job to be executed on vectorized data representing the first document completely vectorized by the image scanning and vectorization unit.

2. An image processing apparatus as claimed in claim 1, wherein the job setting unit also is configured, while the image scanning and vectorization unit is scanning the first document and before the image scanning and vectorization unit has completed vectorizing the first document, to allow a user to input settings for a job on partial image data representing a portion of the first document that has been scanned by the image scanning and vectorization unit.

3. An image processing apparatus as claimed in claim 1, further comprising a data transfer unit configured to transfer vectorized data, which represents the first document completely vectorized by the image scanning and vectorization unit, to a unit that processes the vectorized data,
    wherein the job comprises the data transfer unit transferring the vectorized data to the unit that processes the vectorized data.

4. An image processing apparatus as claimed in claim 1, further comprising an image managing unit configured to manage image data and vectorized data in association with each other, the image data representing the first document scanned by the image scanning and vectorization unit, and the vectorized data representing the first document vectorized by the image scanning and vectorization unit.

5. An image processing apparatus as claimed in claim 4, wherein said job setting unit is configured to allow the user to set processes to be performed using the vectorized data, except for a printing process, using the image data corresponding to the vectorized data.

6. An image processing apparatus as claimed in claim 3, further comprising a warning unit configured to output warning information in a case where the vectorized data to be transferred by said data transfer unit has not yet been generated by said image scanning and vectorization unit.

7. An image processing apparatus as claimed in claim 6, wherein said warning unit is further configured to output information prompting a user to select whether to continue the job using image data representing all or a portion of the first document that has been scanned by the image scanning and vectorization unit, or to continue the job after waiting for complete registration of the vectorized data necessary for continuing the job.

8. An image processing method comprising:
 an image scanning and vectorization step of scanning and vectorizing a first document; and
 a job setting step of, while the scanning of the first document is being performed in the image scanning and vectorization step and before the vectorizing of the first document has completed in the image scanning and vectorization step, (a) making available a user-interface configured to identify a plurality of documents and allow a user to select a document out of the plurality of documents, the plurality of documents including documents for which vectorization has been completed and documents for which vectorization is in process but not yet completed, the documents for which vectorization is in process but not yet completed including the first document, and (b), after a user selects, via the user-interface, the first document out of the plurality of documents identified by the user-interface, allowing a user to input settings for a job to be executed on vectorized data representing the first document completely vectorized in the image scanning and vectorization step,
 wherein said steps are performed at least by hardware components of an image processing apparatus.

9. A non-transitory computer-readable storage medium storing a program configured to be executed by an image processing apparatus, the program comprising:
 an image scanning and vectorization module configured to scan and vectorize a first document; and
 a job setting module configured, while the image scanning and vectorization module is scanning the first document and before the image scanning and vectorization module has completed vectorizing the first document, to (a) make available a user-interface configured to identify a plurality of documents and allow a user to select a document out of the plurality of documents, the plurality of documents including documents for which vectorization has been completed and documents for which vectorization is in process but not yet completed, the documents for which vectorization is in process but not yet completed including the first document, and (b), after a user selects, via the user-interface, the first document out of the plurality of documents identified by the user-interface, allow a user to input settings for a job to be executed on vectorized data representing the first document completely vectorized by the image scanning and vectorization module.

* * * * *